March 31, 1964  R. M. FALLIS  3,127,102
FLIGHT NAVIGATION INSTRUMENT

Filed March 1, 1963  2 Sheets-Sheet 1

INVENTOR

Robert M. Fallis

March 31, 1964   R. M. FALLIS   3,127,102
FLIGHT NAVIGATION INSTRUMENT
Filed March 1, 1963   2 Sheets-Sheet 2
Fig.3
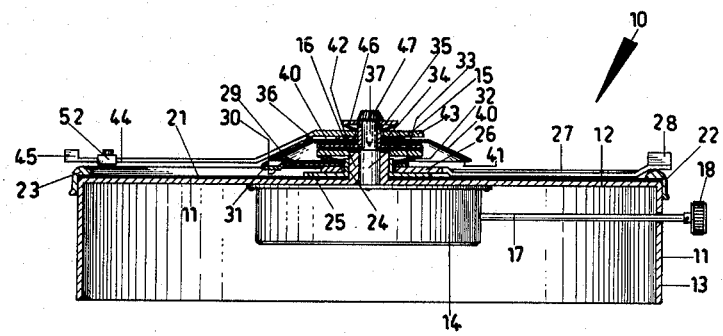
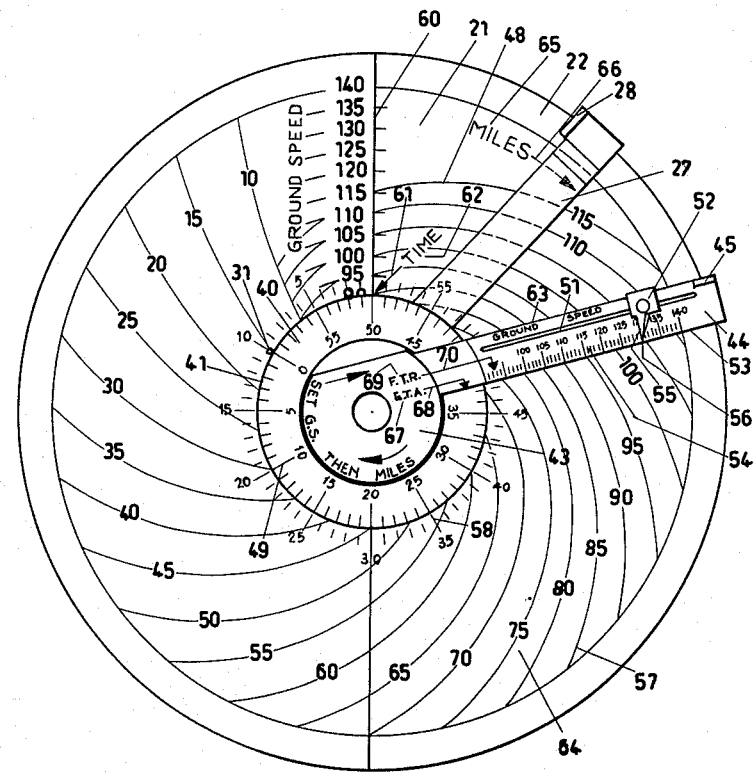
Fig.4
INVENTOR
Robert M. Fallis

United States Patent Office 3,127,102
Patented Mar. 31, 1964

3,127,102
FLIGHT NAVIGATION INSTRUMENT
Robert M. Fallis, 466 Patricia Drive,
Oakville, Ontario, Canada
Filed Mar. 1, 1963, Ser. No. 262,088
4 Claims. (Cl. 235—61)

This invention relates to improvements in flight navigation apparatus and, more particularly, to improvements in portable devices for determining chronological flight data in conjunction with "distance remaining to destination" at all times during a flight.

It is often required by an aircraft crew or navigator to instantaneously determine:

(1) the distance remaining to destination
(2) distance already flown
(3) time of arrival at destination
(4) the number of minutes flying time remaining before fore the destination is reached and,
(5) time already flown.

In cases where longer flights are broken into legs, which consist of straight line distances between consecutive check points along a planned route, the word "destination" may refer to one of such check points.

At the beginning of a flight where such an instrument of the prior art is to be used, two initial settings must be made on the instrument, i.e., estimated average ground speed and the number of miles to the destination. The type of scale used on many instruments of the prior art is such that an accurate setting of these figures is not possible, the user selecting the nearest available figure when making them. This, of course, usually results in an error being incorporated automatically into any results obtained from the instrument.

Another disadvantage with the majority of flight navigation instruments of the prior art is that they do not continuously indicate the chronological time, with respect to the number of minutes after the current hour, regardless of the number of consecutive or separate sequences of operation completed. They thus require a second chronometer type instrument to enable the user to compute the total elapsed time since take-off.

While navigational computers are available which overcome these defects, they are both bulky, of complicated design, and highly expensive. In the majority of cases, therefore, such computers are not available to operators of small and light aircraft.

It is an object of this invention to provide a flight navigation instrument for constant, instantaneous determination during a flight of flight time flown and flight time left to a destination.

It is another object of this invention to provide a flight navigation instrument that indicates the distance remaining to a destination at any time.

It is another object of this invention to supply the user an automatically arrived at indication of the estimated time of arrival at destination, as well as a record of the estimated ground speed which he originally calculated and selected.

It is a further object of this invention to provide a flight navigation instrument containing chronometer means for constant mechanical and automatic adjustment of in-flight data, as well as effecting continuous indication of the chronological time in minutes after the current hour throughout an operational run or series of operational runs having been once set at the outset of such operational run or series of runs.

It is a further object of this invention to provide a flight navigation instrument that will provide a record of flight time elapsed and flight time remaining and the distance remaining to the destination at any time upon known factors of chronological time of day, estimated ground speed, and total distance to destination being entered upon the instrument at the outset of the flight.

Yet another object of the invention is to provide a flight navigation instrument which in the setting of the above mentioned known factors, employs a scale with an infinite number of locations thereon, thereby allowing the user to make absolutely precise settings.

It is a further object of this invention to provide a flight navigation instrument that may be manually adjusted at the outset of flight with a minimum of time and effort, and with a minimum number of steps in the setting procedure. When changes are noted in wind velocity or direction, or aircraft cruising speed, or location of destination, the appropriate change may be easily entered on the instrument without disturbing the other previously entered settings.

It is still another object of this invention to provide instantaneous information on the above data requirements while inherently maintaining that degree of accuracy present in the original calculations and the subsequent setting of the instrument at the commencement of the flight run.

It is yet another important object of this invention to provide a flight navigation instrument of sufficient simplicity of production and operation to place such an instrument within economical reach of any pilot, navigator or the like.

These and other objects and features of this invention will become apparent when read in conjunction with the following description and the accompanying drawings in which:

FIG. 3 is a sectional side elevation of the instrument shown in FIG. 2 taken on the line 3—3.

FIG. 4 is a plan view of the instrument incorporation, showing one of the interchangeable dial cards in place.

Figure 1:
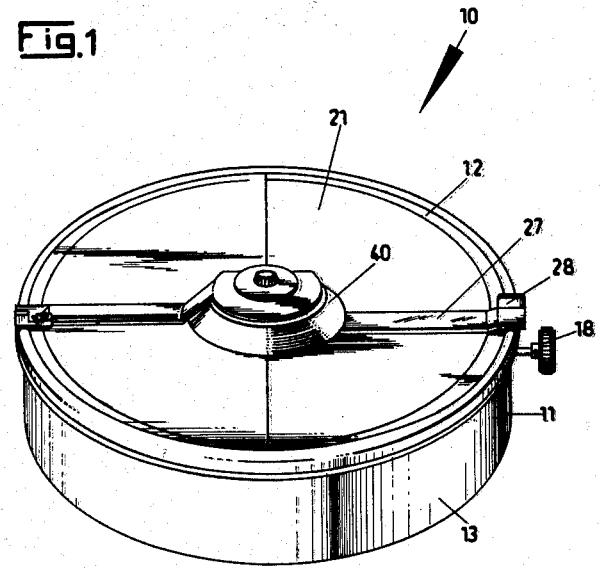
FIG. 1 is a perspective view of a flight navigation instrument incorporating the present invention.
Figure 2:
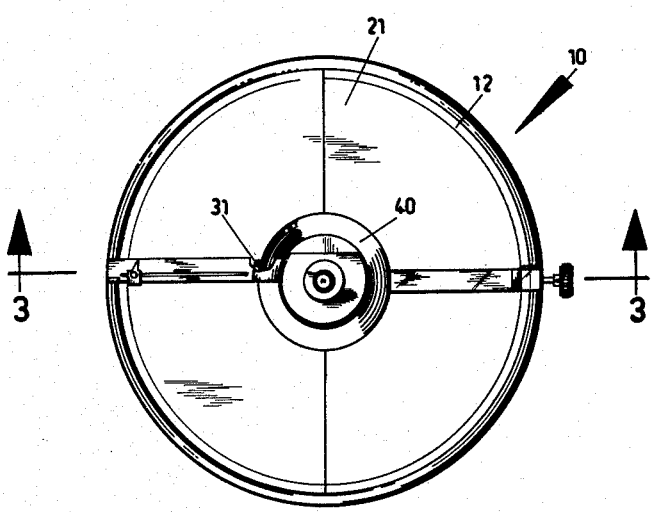
FIG. 2 is a plan view of the flight navigation instrument shown in FIG. 1.

Referring to FIGS. 1, 2 and 3, a flight navigation instrument 10 includes a hollow, cylindrical body 11, comprising a circular face plate 12 and a side wall 13 forming a rim therefor.

A clock mechanism 14 is attached to the centre of the undersurface of face plate 12, and a centre spindle 15, corresponding to the minute hand shaft of a conventional clock movement, projects through face plate 12 and is rotatably supported by a co-axial boss 16 which extends upwardly from the upper surface of face plate 12.

It should be noted that clock mechanism 14 may be of the conventional spring actuated type as herein illustrated, in which case a winder arm 17 extends radially outwardly therefrom to pass freely through side wall 13 terminating in a winding knob 18.

It is also envisaged that mechanism 14 may be electrically operated either by self contained batteries or by being connected to an aircraft electrical system.

A dial card 21, formed of a thin circular disk of cardboard or the like is centrally perforated to permit its assembly over the boss 16 to lie flat on face plate 12, card 21 being substantially the same diameter as face plate 12. A retaining ring 22 is a push fit over the upper end of side wall 13 of body 11 and an inwardly extending flange 23 on the upper edge thereof is adapted to press down upon the edge of card 21 and thereby hold card 21 securely in place on face plate 12.

A bushing 24 is located over boss 16 and co-axially therewith, bushing 24 having a base flange 25 adapted to rest on the upper surface of the centre portion of dial card 21.

A centrally perforated disk 26 is slideably located over bushing 24 to lie on the upper surface of flange 25, and an arm 27 extends radially outwardly from disk 26 to the peripheral edge of face plate 12, where it terminates in an upwardly extending tab 28. It should be noted that arm 27 is held in close, parallel, slightly spaced apart adjacent to the upper surface of dial card 21 and is suitably bent at the outer end to permit the portion holding tab 28 to slideably rest on the flange 23 of the retaining ring 22. A second disk 29 is adapted to fit over bushing 24 and lie on the upper surface of disk 26. A short arm 30 extends radially outwardly from disk 29 and terminates in a pointer 31.

The upper edge of bushing 24 extends slightly above disk 29 and the whole assembly is retained on boss 16 by means of a spring washer 32 and a thin nut 33. Nut 33 is threaded onto the upper end of boss 16 which, of course, carries a suitable screw thread to accommodate it.

From FIG. 3 it will be seen that the upper end 37 of centre spindle 15 is reduced in diameter above boss 16, to form a shoulder 34. A bushing 35 having a wide base flange 36 is adapted to be a push fit over the reduced portion 37, the flange 36 resting on shoulders 34. It should be noted that flange 36 is spaced apart from nut 33 to permit the rotation of bushing 35 in relation to nut 33.

A moving dial 40, preferably comprising a centre disk of slightly greater diameter than base flange 36 of bushing 35, is centrally perforated to fit over bushing 35 and to rest on the upper surface of base flange 36, and in the preferred embodiment herewith illustrated, the peripheral edge of dial 40 extends downwardly and outwardly in a conical configuration to terminate in spaced apart adjacency with arm 30 of disk 29. The pointer 31 of arm 30 is adapted to register with the edge 41 of dial 40.

A spacer washer 42 also fits over bushing 35 to rest on the upper surface of dial 40 and an upper disk 43, again centrally perforated, is adapted to pass over bushing 35 to lie on spacer washer 42.

A moving arm 44 extends radially outwardly from disk 43 and is contoured to pass over the moving dial 40 in close but spaced apart adjacency and then to extend over the surface of face plate 12, parallel therewith and sufficiently spaced above it to permit it to pass over arm 27 if necessary. Moving arm 44 terminates in a vertical tab 45 which is approximately the same distance from the centre of face plate 12 as the tab 28 on arm 30.

The complete assembly including bushing 35, moving dial 40, spacer washer 42, and upper disk 43 is retained on the reduced portion 37 of centre spindle 15 by means of a spring washer 46 and a knurled nut 47, the upper end of the reduced portion 37 being suitably threaded to accommodate nut 47.

It will be noted that in the previously described assembly at the lower end of spindle 15, the nut 33 bears solidly on bushing 24 and spring washer 32 therefore acts as a spring loaded clutch arrangement on the disks 26 and 29.

Similarly at the upper end of the assembly, nut 47 holds bushing 35 hard upon shoulder 34 of centre spindle 15 while the spring washer 46 exerts pressure on upper disk 43, spacer washer 42, and moving dial 40 to again act as a spring clutch.

It will be seen that under normal conditions the lower assemblies of disks 26 and 29 will remain static upon bushing 24, while moving dial 40, spacer washer 42 and upper disk 43 move with centre spindle 15 upon the latter being activated by clock mechanism 14.

Referring also to FIG. 4 it will be seen that arms 27 and 44 are preferably of thin, flat, rigid material and, in a preferred embodiment, may be constructed of a transparent material such as plastic to permit the viewing of the indicia 48 inscribed on the upper surface of dial card 21. Arms 27 and 44 are substantially the same width and may be located one above the other in substantially full alignment, the tab 28 on arm 27 being in contact with tab 45 of arm 44. From this position, arm 27 may remain static while arm 44 is caused to move in a circle over the surface of dial card 21 under the influence of clock mechanism 14. The edge 41 of moving dial 40 is equally divided into 60 sub-divisions 49 which, for convenience sake, may be grouped in units of five and marked accordingly.

A slot 51 is formed in moving arm 44 and extends for a greater part of the length thereof and substantially parallel with the edges. A pointer 52 is slidable upon the upper surface of arm 44 and is retained and guided by slot 51, there being sufficient friction between pointer 52 and arm 44 to ensure the former remaining in any selected position while still being manually movable. The invention also contemplates the use of leaf springs or the like to provide the required friction between pointer 52 and arm 44, and a manually operable locking device to maintain the pointer 52 at the desired setting.

As viewed in plan in FIG. 4, arm 44 moves in a clockwise direction when motivated by mechanism 14. The leading edge 53 of arm 44 is suitably subdivided into a scale 54 giving a range of ground speed readings compatible with the aircraft type in which instrument 10 is to be used.

Pointer 52 is provided with a straight edge 55 adapted to be easily and accurately aligned with the indicia of scale 54 and the point 56 of pointer 52 locates this reading at the edge 53 of arm 44.

The upper surface of dial card 21 is subdivided by a plurality of spiralling curved lines 57, each of which represents a five mile increment of distance remaining in miles to the aircraft destination, lines 57 being plotted on a graph having "ground speed in m.p.h." and "time remaining in minutes" as the coordinates.

Sixty equi-spaced lines 58 extend radially outwardly from the centre of dial card 21 to locations outwardly of moving dial 40, each line 58 representing one minute of time remaining to the destination, lines 58 again being grouped in fives for ease of numbering and reading.

A base line 60 extends radially across dial card 21 to provide a starting and finishing point for graph lines 57 and also acts as a zero line when initially setting the required readings on device 10. It is also subdivided and suitably marked to provide an accurate check for scale 54 of ground speed inscribed on arm 44.

*In Operation*

A pilot or navigator wishing to use instrument 10 enters the following settings immediately prior to flight:

(1) Set moving dial 40 so that the subdivision 49 of indicia 48 which corresponds to the time of day in minutes past the current hour is in alignment with base line 60. An arrow 61 and the word "time" 62 indicates the correct position, and in FIG. 4 the figure 50 being in alignment indicates that the time is ten minutes to the hour. It should be understood that the clock mechanism 14 is operative at this time.

(2) Set edge 55 of pointer 52 to the estimated ground speed on scale 54 of moving arm 44. The words "ground speed" 63 may be inscribed on arm 44 to identify scale 54.

(3) Bring tabs 28 and 45 into juxtaposition so that their respective arms 27 and 44 are located one over the other and then move both arms to a location where point 56 of pointer 52 touches the curved line 57 corresponding to the number of miles to the destination. Lines 57 are arranged in five mile increments and these have identifying figures 64. The legend "miles" 65 and an arrow 66 are inscribed on the face of dial card 21 to guide the user in this setting and subsequent readings. Should the distance to destination be other than a multiple of 5, the spacing between lines 57 is sufficiently large that the user may quite accurately estimate the absolutely correct setting for pointer 52. It should be noted that, upon arm 44 being correctly set as described, the leading edge 53 registers with a subdivision 49 of indicia 48 on moving dial 40, this particular subdivision thereby indicating the estimated time of arrival of the aircraft at its destination. The legend "E.T.A." 67 and an arrow 68 indicate this reading.

(4) Set pointer 31 to register with the zero mark of indica 48 on moving dial 40.

After take off, moving dial 40 acts as a clock, and arrow 61 always gives the time in minutes past the current hour.

Moving arm 44 also moves at a speed which corresponds with the minute hand of clock mechanism 14 and as time elapses, the movement of arm 44 causes points 56 of pointer 52 to register with progressively lower numbered curved lines 57, thereby instantly indicating the number of miles remaining to the destination.

At the same time, the forward edge 53 of arm 44 registers with minute lines 58 inscribed on the surface of card 21. Lines 58 being static and arm 44 moving, this reading becomes progressively less and the line 58 registering with edge 53 thereby indicates the flight time remaining to the destination. The legend "F.T.R." 69 and an arrow 70 are utilized to bring this to the user's attention.

Other information obtainable from device 10 is the amount of time elapsed since take off—indicated by pointer 31 against indicia 48 of moving dial 40.

Arm 27 serves to indicate the starting settings, thereby providing a datum point for the checking or re-checking of in-flight calculations.

From the foregoing description it will be seen that all the general flight information required especially by operators of light aircraft is obtainable from device 10 in a straightforward, direct reading manner. Furthermore, should all the information on the original settings be correct, the leading edge 53 of arm 44 is coincident with base line 60 upon the aircraft arriving at its destination and even without reading any specific numbers on the dial card 21, a pilot can fairly accurately estimate his proximity to the destination by the angle formed between leading edge 53 and line 60.

Upon using device 10 on a long flight of several "legs," the arrival over a check point and the relative positions of leading edge 53 and line 60 indicate the degree of accuracy of information originally provided so that necessary allowances may be made when setting the instrument for the next leg.

It should be noted that another advantage of device 10 is that should a change of conditions occur in flight such as, for instance, in wind direction or velocity, or in aircraft cruising speed, the change in the estimated ground speed reading can be made moving pointer 52 to the appropriate setting and then moving arm 44 so that point 56 again registers with the appropriate curved line 57 giving the distance to destination at the time of change. This action automatically resets the E.T.A. so that in two simple re-setting movements all the required data on the change in flight plan is provided, thereby eliminating time consuming and tedious calculation.

It is recognized that various types of aircraft have varying performance figures, particularly in speed and range. In order to adapt instrument 10 to allow for use with aircraft having different maximum and cruising speeds, the scale 54 on arm 44 must be changed, preferably by replacing disc 43 and its arm 44 by another substantially identical item having the revised scale 54 thereon. Also it may be necessary to change the markings on dial card 21 so that it is envisaged that a kit be supplied for each device 10, said kit containing the relevant disc 43 and arm 44 assembly and the matching dial card 21.

It is also within the scope of the invention to provide a clock mechanism which may cause moving dial 40, upper disc 43 and, therefore arm 44, to move at any radial speed over the dial card 21, not necessarily at the speed of a minute hand, substantially to allow for its use with aircraft having high speed and/or long duration, the various scales being adapted for use therewith.

The general design of the individual parts of the invention as explained above may be varied according to requirements in regards to manufacture and production thereof, while still remaining within the spirit and principle of the invention, without prejudicing the novelty thereof.

The embodiments of this invention in which an exclusive property or privilege is claimed are defined as follows:

1. A flight navigation instrument including a face plate; a dial card mounted on the upper surface of said face plate; a first arm extending radially over the upper surface of said dial card; a second, shorter arm extending radially over said upper surface of said dial card above said first arm; means retaining said first and second arms in position on said face plate; said retaining means permitting said first and second arm to be moved manually, independently of each other and of said dial card, and holding said first and second arms in their selected positions upon removal of manual pressure; first pointer means attached to the outer end of said second arm; a moving disc; the periphery of said moving disc being subdivided and said subdivisions registering successively with said first pointer; a moving arm extending radially over said face plate above said first arm and said moving disc; means retaining said moving arm and said moving disc centred over said dial card and permitting said moving arm and said moving disc to be moved manually, independently of each other; a drive means common to said moving arm and said moving disc causing them to rotate arcuately over said dial card about the centre thereof; second pointer means adjustably attached to said moving arm; a scale inscribed on said moving arm to facilitate the setting of said second pointer; a plurality of graph lines inscribed on said dial card; said second pointer being successively registerable with said graph lines upon said moving arm moving over the surface of said dial card; and a radially extending base line inscribed on the surface of said dial card.

2. A flight navigation instrument as defined in claim 1 in which said face plate is circular and is perforated centrally; a boss on the upper surface of said face plate surrounding said perforation; first and second disc means supporting said first and second arms respectively; said first and second discs having holes formed centrally therethrough to permit their assembly over said boss, a first nut means threadably attached to said boss for the retention of said first and second discs on said face plate; resilient means interposed between said first nut and said second disc to maintain said first and second discs in frictional relation with each other and said face plate; said drive means including a clock mechanism located under said face plate; a driving spindle extending from said clock mechanism, through said boss; a shoulder formed on said spindle above said boss; a third disc supporting said moving arm; said moving disc and said third disc being centrally perforated to fit over the upper end of said spindle and rest on said shoulder; second nut means co-operable with said upper end of said spindle to retain said moving and third discs on said spindle; and resilient means interposed between said second nut means and said third disc to maintain said moving and third discs in frictional relation with each other and said shoulder of said spindle.

3. A flight navigation instrument as defined in claim 1 including a retaining ring frictionally retained on the periphery of said face plate; a flange extending inwardly from said retaining ring onto the upper surface of said face plate; said flange pressurably retaining the outer edges of said dial card in contact with said face plate.

4. A flight navigation instrument as defined in claim 1 in which said face plate is circular and is perforated centrally; a boss on the upper surface of said face plate surrounding said perforation; a bushing closely slideable over said boss and having a base flange resting on said dial card; the upper end of said bushing being below the upper end of said boss; first and second disc means supporting said first and second arms respectively; said first and second dic having holes formed centrally therethrough to permit their assembly over said bushing; first nut means threadably attached to said boss for the retention of said first and second discs on said bushing and the maintain said bushing hard against said face plate; resilient means interposed between said first nut and said second disc to maintain said first and second discs in frictional relation with each other and the upper surface of said flange; said drive means including a clock mechanism located under said face plate; a rotatable driving spindle extending from said clock mechanism coaxially through said boss; a shoulder formed on said spindle above said boss; a third disc supporting said moving arm; a second bushing slidable over said upper end of said spindle; said second bushing having a base flange resting on said shoulder; said moving disc and said third disc being centrally perforated to fit over said second bushing and rest on said base flange; second nut means co-operable with said upper end of said spindle to retain said second bushing on said spindle; resilient means interposed between said second nut means and said third disc to maintain said moving and third discs in frictional relation with each other and said base flange of said second bushing; and a retaining ring co-operable with the peripheral edge of said face plate, having an inwardly extending flange adapted to press the edge of said dial card onto the upper surface of said face plate.

No references cited.